United States Patent [19]

Suzuki et al.

[11] 4,436,130
[45] Mar. 13, 1984

[54] PNEUMATIC RADIAL TIRE HAVING AN EXCELLENT SIDE-CUT RESISTANT PROPERTY

[75] Inventors: Yasuo Suzuki, Akigawa; Masaru Abe, Sayama; Toshiro Tezuka, Higashi-Murayama, all of Japan

[73] Assignee: Bridgestone Tire Co., Ltd., Tokyo, Japan

[21] Appl. No.: 416,520

[22] Filed: Sep. 9, 1982

Related U.S. Application Data

[63] Continuation of Ser. No. 244,481, Mar. 16, 1981, abandoned, which is a continuation of Ser. No. 63,641, Aug. 1, 1979, abandoned, which is a continuation of Ser. No. 773,733, Mar. 2, 1977, abandoned.

[30] Foreign Application Priority Data

Mar. 4, 1976 [JP] Japan .................................. 51-22651

[51] Int. Cl.³ .......................... B60C 9/04; B60C 9/08; B60C 9/14
[52] U.S. Cl. ............................ 152/353 R; 152/354 R; 152/355; 152/356 R; 152/359; 152/357 R; 152/360; 152/356 A
[58] Field of Search ............ 152/354, 355 R, 355 RB, 152/356 R, 356 A, 357 R, 357 A, 358–360, 361 R, 361 FP, 361 DM, 352, 353

[56] References Cited

U.S. PATENT DOCUMENTS

| 3,090,189 | 5/1963 | Boussu et al. ........................ 57/139 |
| 3,392,774 | 7/1968 | Le Bosse ........................ 152/361 R |
| 3,449,199 | 6/1969 | Mead ............................... 152/357 R |
| 3,682,222 | 8/1972 | Alderfer ........................... 152/361 R |
| 3,700,012 | 10/1972 | Alderfer .............................. 156/196 |
| 3,703,203 | 11/1972 | Simpson ........................... 152/354 R |
| 3,961,657 | 6/1976 | Chrobak ............................. 152/355 |
| 3,980,119 | 9/1976 | Nakasaki ............................. 152/354 |
| 3,982,580 | 9/1976 | Inoue et al. ..................... 152/361 R |
| 4,077,454 | 3/1978 | Miyoshi et al. ...................... 152/354 |
| 4,215,735 | 8/1980 | Sato ............................... 152/330 RF |

FOREIGN PATENT DOCUMENTS

| 2340310 | 2/1975 | Fed. Rep. of Germany ...... 152/354 |
| 2096405 | 2/1972 | France .............................. 152/359 |

Primary Examiner—Lois E. Boland
Attorney, Agent, or Firm—Sughrue, Mion, Zinn, MacPeak & Seas

[57] ABSTRACT

A pneumatic radial tire having an excellent side-cut resistant property is disclosed. The radial tire comprises at least one extensible and compressible rubberized side portion reinforcing layer arranged at that area of a side portion of the tire which is inclusive of at least maximum cross-section position of the carcass and each containing a reinforcing element embedded therein and composed of helically formed filaments or at least 2 bundles each formed by merely assembling together the helically formed filaments without twisting at random. The helically formed filament is formed of a material having a tensile breaking strength of at least 140 kg/mm². The reinforcing element has an elongation at tensile breaking strength which is at least 1.2 times larger than that of a metal cord of a radial carcass.

15 Claims, 15 Drawing Figures

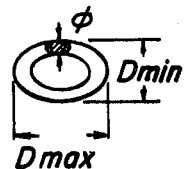
FIG.2a  FIG.2b
$$D = \frac{Dmax + Dmin}{2}$$
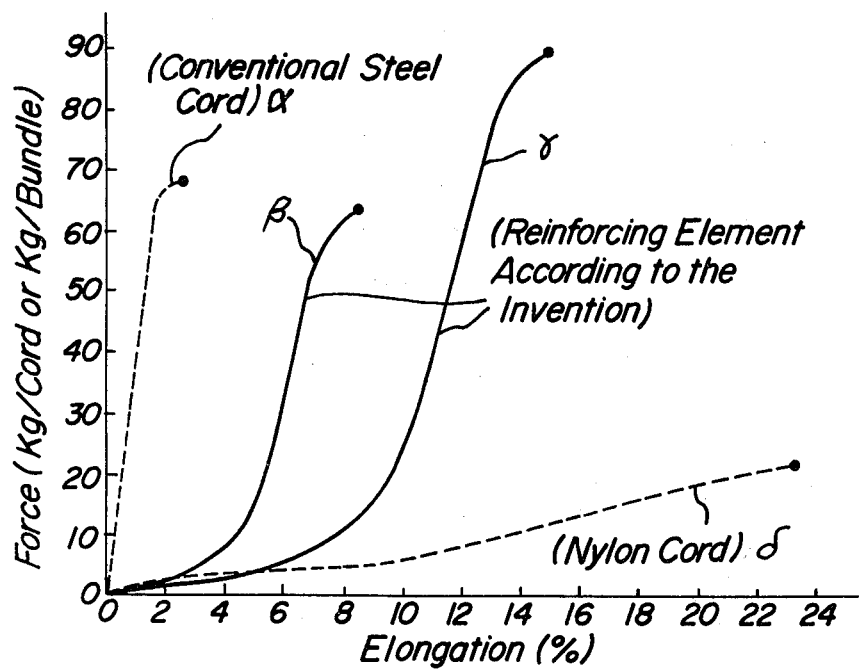
FIG.3

PNEUMATIC RADIAL TIRE HAVING AN EXCELLENT SIDE-CUT RESISTANT PROPERTY

This is a continuation of application Ser. No. 244,481 filed Mar. 16, 1981 now abandoned, which is a continuation of application Ser. No. 063,641 filed Aug. 1, 1979 now abandoned which is a continuation of Ser. No. 773,733 filed Mar. 2, 1977, now abandoned.

This invention relates to a pneumatic radial tire having an excellent side-cut resistant property such as a construction vehicle, for example, front-end loader, offhigher hauler, trucks, ralley racing vehicles, etc. which travel on road at least one part of which is inclusive of off-road area, and more particularly to an improved side portion reinforcing construction for pneumatic radial tires comprising a radial carcass containing carcass cords arranged along a radial plane of the tire or substantially in parallel therewith and a belt superimposed about the radial carcass and having a high rigidity in circumferential direction.

Such kind of tire travels on a rough road which has not been completed as a running road and hence has an opportunity of being frequently subjected to cuts when the tire rides on sharp rock, mineral ore, metal piece or stub scattered on the road. When the pneumatic radial tire travels on such site, the cut caused by the ground contact surface is prevented by the presence of a thick tread rubber and belt layer having a rigidity, but an area of the tire extending from its shoulder portion to its side portion is substantially defenseless against the cut failure.

In general, in the area of the pneumatic radial tire extending from its shoulder portion to its side portion are arranged only one or at most several carcass plies and a thin side wall rubber superimposed about these carcass plies. As a result, the cut resistance of such area becomes low. Particularly, a pneumatic radial tire comprising a carcass ply cord formed of a steel cord tends to produce rust by water penetrated through cracks produced by cuts and induces a premature brakage of the carcass ply. In addition, the cracks on the side are different from those on the ground contact surface and become open and grown into a large crack. As a result, even when such large crack is repaired, such repaired crack tends to be grown again, so that the repair becomes very difficult. As a result, the tire whose side portion is subjected to cut becomes useless waste tire.

Many attempts have been made to overcome this problem, but hitherto none has led to fully satisfactory results.

A first type tire which has heretofore been proposed to overcome this problem is provided at its area extending from a shoulder portion to a side portion with a rubber projection which functions to prevent the side-cut. This first type of tire can prevent the side portion from being damaged by rocks, etc. which are travelled over by the ground contact surface of the tire or which are pushed sidewardly from the ground contact surface of the tire. But, this first type tire can not prevent the side portion against rocks which are larger than the rubber projection or sharp end of the rocks raised upwardly when the ground contact surface rides on one side of the rocks. In addition, the presence of the thick projection extended from the shoulder portion to the side portion of the tire tends to raise the temperature at the belt end which is a weak point of the radial tire, thereby deteriorating the high speed durability inherent to the pneumatic radial tire.

A second type tire which has also been proposed to overcome the above mentioned problem is provided on the inside of the carcass ply at the side portion with a thick rubber or a rubberized layer containing cords embedded therein. This second type tire only conservatively functions to decrease flexure of the side portion so as to make less a chance of producing the side-cut failure. The side-cut subjected to the tire is developed into a vital defect and hence any positive function of preventing the carcass ply at the side portion from being subjected to the side-cut could not be expected from this second type tire.

A third type tire which has heretofore been proposed to overcome the above mentioned problem comprises a reinforcing cord arranged at the side wall so as to prevent the carcass ply from being subjected to the side-cut. This third type tire functions to prevent the carcass ply from being subjected to the side-cut to a certain extent.

In the second type tire, the protective layer is formed of a textile cord having a small tensile breaking strength, so that the cut preventive effect is small. In the third type tire, the protective layer is arranged near the bead, so that the area of the tire which is extended from the shoulder portion to the side portion and which has many chances of being subjected to the cut is not protected.

Under such circumstances, it is natural that skilled persons should imagine an idea of arranging a rubberized reinforcing layer containing steel cords embedded therein on overall surface of the side portion of the tire as the protective layer against the side-cut thereof. However, the side portion of the radial tire is subjected to the largest flexure, and as a result, when the tire is subjected to the load and the side portion thereof becomes deformed, the rubberized reinforcing layer containing the steel cords embedded therein and arranged at the side portion causes a large strain at the steel cord ends since the steel cord per se is inextensible, thereby inducing a separation failure of the steel cord ends and hence a breakage of the tire.

An object of the invention, therefore, is to provide a pneumatic radial tire which can obviate the above described drawbacks which have been encountered with the conventional techniques and which can travel on off-road without a side-cut failure.

A feature of the invention is the provision of a pneumatic radial tire having an excellent side-cut resistant property, comprising a radial carcass body composed of at least one rubberized ply layer each containing metal cords embedded therein and a belt superimposed about said radial carcass body and having a high rigidity, said tire comprising at least one extensible and compressible rubberized side portion reinforcing layer arranged at that area of a side portion of the tire which is inclusive of at least maximum cross-section position of the carcass and each containing a reinforcing element embedded therein and composed of helically formed filaments each formed of a material having a tensile breaking strength of at least 140 kg/mm$^2$ or at least 2 bundles each formed by merely assembling together said helically formed filaments without twisting at random, said reinforcing elements each having an elongation at tensile breaking strength which is at least 1.2 times larger than that of said metal cord of the radial carcass.

In preferred embodiments of the invention, the following conditions have to be satisfied.

(1) The helically formed filament of the reinforcing element has a diameter $\phi$ of 0.1 mm to 1.0 mm, average diameter D of an outer contour projected on a plane perpendicular to the axial direction of one pitch of the filament and defined by $$\frac{Dmax + Dmin}{2}$$

of 2 $\phi$ to 20 $\phi$.

(2) The helically formed filament of the reinforcing element is formed of a steel wire.

(3) The reinforcing element has a ratio $\delta$ of a space formed between the two adjacent reinforcing filaments to a pitch S in mm between the midlines of the reinforcing elements given by $$\delta = \frac{S - (D + d - \phi)}{S} = 0.11 \text{ to } 0.78$$

where d is an effective diameter in mm of the reinforcing element which is given by $$1.25\sqrt{N} \times \phi$$

where N is the number of filaments for constituting the reinforcing element.

(4) The rubber containing the reinforcing element embedded therein has a Shore A hardness of 50° to 85°, 300% modulus of elasticity of 80 to 230 kg/cm² and tensile breaking strength of 150 to 250 kg/cm².

(5) The side portion reinforcing layer is arranged on the outside of the radial carcass.

(6) The side portion reinforcing layer is independently arranged on each of two side portions of the tire.

(7) The side portion reinforcing layer is continuously extended from one of the two side portions of the tire through the crown portion to the other side portion.

(8) The reinforcing element of the side portion reinforcing layer located at the maximum width position of the carcass in a vertical center section through the rotational axis of the tire is inclined at 0° to 70° with respect to a radial plane which is projected on and in parallel with said section.

(9) The side portion reinforcing layer is composed of at least two layers whose reinforcing elements are crossed with each other.

The side portion of the pneumatic tire is primarily subjected to the largest deformation and this deformation is particularly remarkable with respect to the pneumatic radial tire, so that it is very difficult to prevent the pneumatic radial tire for off-road vehicles from being subjected to the side-cut.

As measures protecting the tire against the side-cut, it has been considered to apply a method of firmly reinforcing the side portion such that the cut can not be pierced therethrough and another method of considerably deforming the side portion when it is struck by rocks and stones, etc. and absorbing deformation energy thus reducing force subjected to the side portion. The former method, however, is not available at all. Because, if the side portion of the tire is reinforced to make its rigidity high, a deflection stiffness of the tire becomes large so as to eliminate the oscillation absorbing property required for the pneumatic tire, and as a result, a stress subjected to the bead portion or tread portion is increased, thereby inducing a premature failure of the tire. It is preferable, therefore, to apply the latter method of absorbing the deformation energy and prevent the side-cut.

The invention will now be described in greater detail with reference to the accompanying drawings, wherein:

FIG. 2a is a side elevation of a helically formed filament for constituting a reinforcing element according to the invention;

FIG. 2b is its end view showing an outer contour projected on a plane perpendicular to the axial direction of one pitch of the filament shown in FIG. 2a;

FIG. 3 is a graph illustrating tensile test results yielded from reinforcing elements according to the invention as compared with that yielded from a conventional steel cord;

Figure 6:
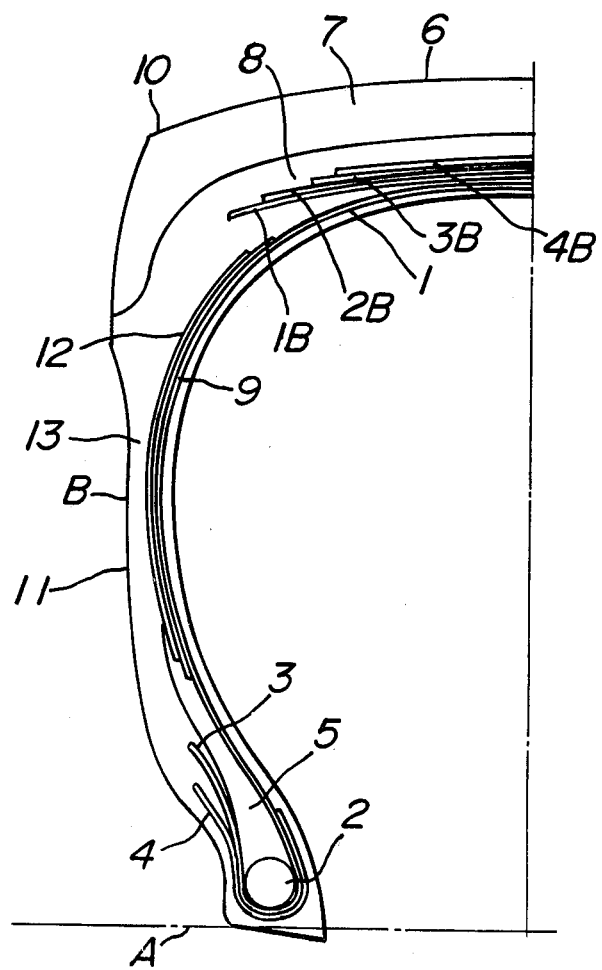
FIG. 6 is a cross-sectional view showing one-half of one embodiment of the tire according to the invention, parts being shown in vertical center section through the rotational axis of the tire.
Figure 7:
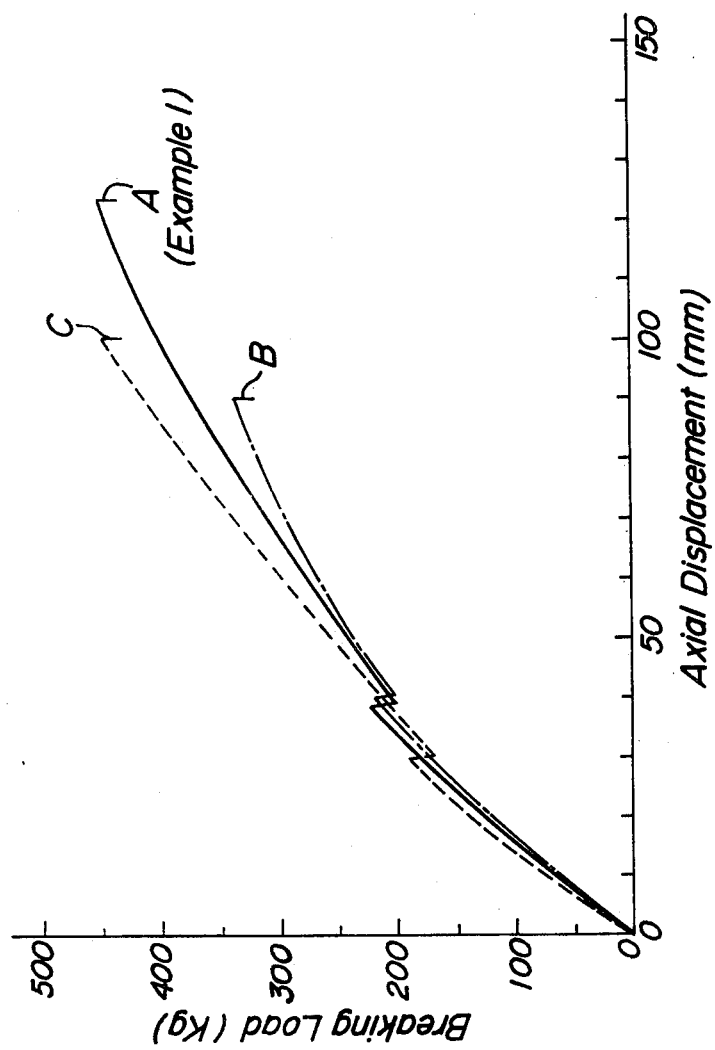

FIG. 7 is a graph illustrating test results of side-cut resistant property of the tire shown in FIG. 6 as compared with those of the conventional tires with the aid of a tapered cutter; and FIGS. 8 to 12 are cross-sectional views showing one-half of various modified embodiments of the tire according to the invention, respectively, parts being shown in vertical center section through the rotational axis of the tire.

Figure 13:
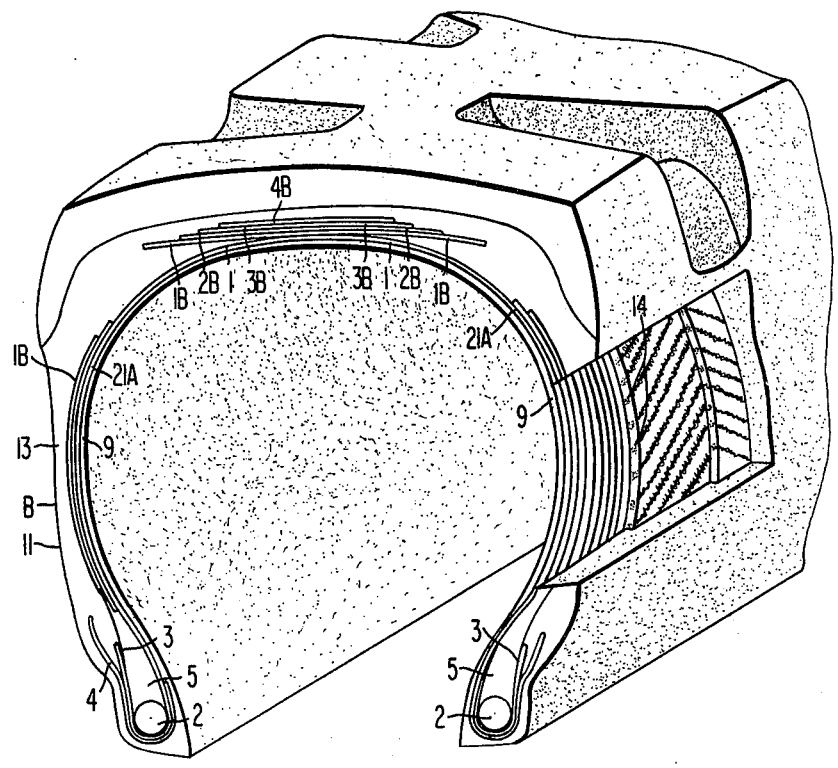

FIG. 13 is a partially cut-away perspective view showing the internal construction of a tire of the invention including bundles of helically formed filaments in a reinforcing layer and radial carcass cords.

Figure 1A:
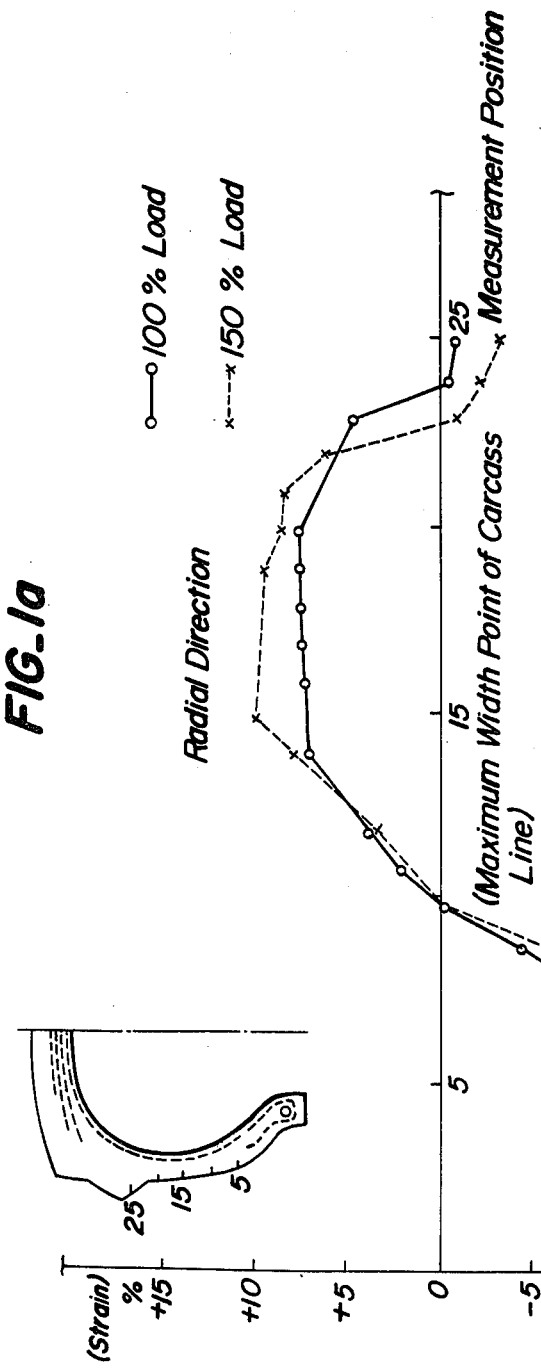
FIG. 1a is a graph illustrating a surface strain in radial direction of a pneumatic radial tire for off-road vehicles.

In FIG. 1a is shown a graph illustrating a surface strain produced in a pneumatic radial tire for off-road vehicles having a size of 21.00 R35. In FIG. 1a, the surface strain in % is taken on ordinate and measurement positions in numbers 5, 10, 15 . . . in radial direction is taken on abscissa.

Figure 1B:
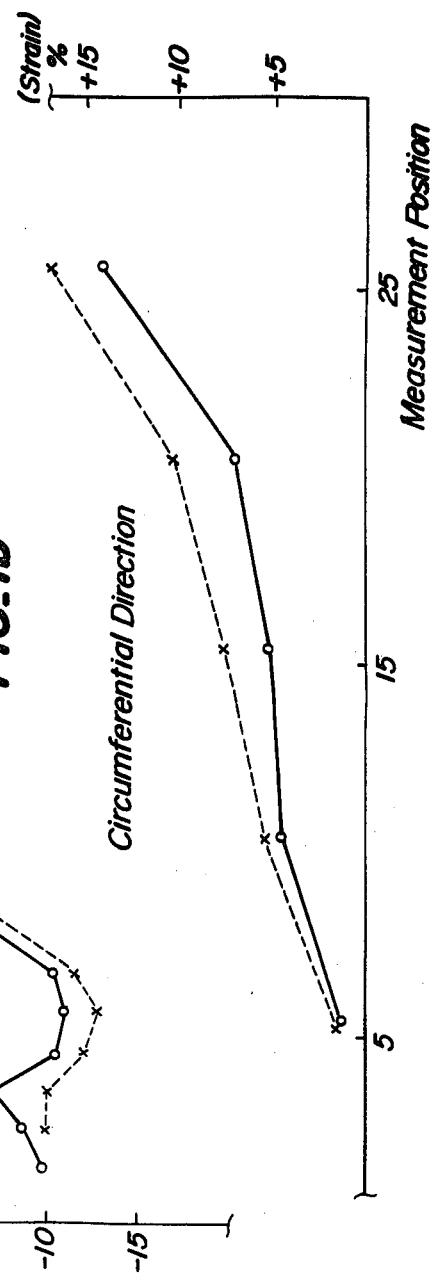
FIG. 1b is a graph illustrating a surface strain in circumferential direction of a pneumatic radial tire for off-road vehicles.

In FIG. 1b is shown a graph illustrating a surface strain in % produced in the same tire as function of measurement positions in circumferential direction.

As seen from FIGS. 1a and 1b, the side portion of the radial tire is significantly deformed.

In the present invention, investigations have been made with respect to side portion reinforcing construction for permitting such large deformation and preventing the side-cut.

The reinforcing element may be formed of materials such as rubber, shredded wires, textile cords represented by nylon cord, steel cord, etc.

The problem which has been encountered with these materials when they are arranged at the area extending from the shoulder portion to the side portion will now be described.

In the case of reinforcing the side portion of the tire without injuring its reflection stiffness, it is preferable to use a reinforcing element whose tensile and compression modulus of elasticities are small. That is, the reinforcing element is required to be easily extensible and compressible.

In the above described materials, rubber is the most suitable for such object. Shredded wires, nylon cord and steel cord are contrary to the object in the order as mentioned above.

As to the cut resistant force, it is preferable to use material having a large breaking strength. For this purpose, steel cord is most effective. Nylon cord, shredded wires and rubber are inferior in the cut resistant force in the order as mentioned above, this order being just opposite to the above mentioned order.

A problem that occurs when the reinforcing element is different in material from adjacent portions will now be described. In the tread portion, even when the reinforcing element is arranged adjacent to portions whose properties are slightly different from those of the reinforcing element, an extremely large strain is not subjected to an interphase between the adjacent layers since the deformation of the tread portion is relatively small. As a result, separation does not occur.

On the contrary, the deformation of the side portion is large as described above, so that if different elements are arranged adjacent with each other in the side portion, a large strain is produced at an interphase between the two adjacent members. There is a risk of this interphase as a nucleus being developed into a separation breakage of the tire.

Judging from the above described point of view, the above mentioned materials for the reinforcing element have drawbacks and hence none has led to fully satisfactory results. That is, the rubber has an extremely small cut resistant force. The shredded wires are not only less in cut resistant force, but also liable to induce a premature separation failure and hence are not suitable. The nylon cords are extensible, so that they are well matched with the material of the adjacent portions, but are insufficient in the cut resistant force.

The steel cords have an excellent cut resistant force, but they have extremely poor in extensible and compressive properties, so that they are not matched with the adjacent materials, thereby inducing separation at the cord ends.

The inventors have noticed a helically formed filament described in U.S. Pat. No. 3,682,222 as a reinforcing element having a tensile breaking strength which is similar to that of the steel cord and an elongation at tensile breaking strength which is similar to that of rubber and nylon cord. Such helically formed filament has properties to be described later. The inventors have investigated the function and movement of the side portion reinforcing layer in greater detail in order to use the helically formed filament as the side portion reinforcing layer for the purpose of effectively protecting the pneumatic radial tire for off-road vehicles comprising the rubberized carcass ply containing the metal cords embedded therein against side cut.

A neutral axis of deformation produced in the side portion when the rubberized carcass ply containing metal cords such as steel cords, etc. is subjected to load is present in the carcass ply since the carcass ply is inextensible and has a large tensile rigidity.

As a result, when the side portion reinforcing layer is arranged on the outside of the carcass ply, the side portion reinforcing layer is subjected to deformation due to elongation. Thus, the reinforcing element of the side portion reinforcing layer is required to have an elongation which is larger than that of the carcass ply. The larger such elongation property of the side portion reinforcing layer must be made the more side portion reinforcing layer is distant apart from the outside of the carcass ply.

On the one hand, when the tire side portion collides with rocks and stones, etc., the tire side portion becomes locally deformed inwardly. In this case, the property of the carcass ply causes the neutral axis of deformation to lie therein and the side portion reinforcing layer arranged on the outside thereof is subjected to compressive force. As a result, the reinforcing element of the side portion reinforcing layer is required to have also an excellent compressive deformation property.

In addition, in the case of arranging the side portion reinforcing layer on the inside of the carcass ply, a reinforcing element having excellent extensible and compressive properties is also required.

The above described considerations and experimental tests have yielded the result that the helically formed filament for the side portion reinforcing layer is required to have the following properties.

The helically formed filament may be formed of material such as steel, metals having a high cut resistant property, glass or organic fibers. The material such as nylon, rayon and the like used usually as the tire cord and having a tensile breaking strength on the order of 80 $kg/mm^2$ to 110 $kg/mm^2$ is substantially unsuitable as the cut resistant material. It has been found out that the cut resistant material aimed at the present invention may be of one having a tensile breaking strength of at least 140 $kg/mm^2$, preferably at least 170 $kg/mm^2$ and at least 190 $kg/mm^2$ when the tire size is larger or the rigidity of the tire case cause the cut resistant property to give to the side portion reinforcing layer.

The reinforcing element composed of helically formed filaments is required to have an elongation at tensile breaking strength which is at least 1.2 times larger than that of the steel cord of the carcass ply. If the reinforcing element is separated from the carcass ply and arranged on the outside relative to, for example, a turn-up portion of the carcass ply, the reinforcing element is required to have an elongation at tensile breaking strength which is at least 1.5 times larger than that of the steel cord of the carcass ply.

The configuration, construction and effect of the side portion reinforcing layer composed of the helically formed filaments will now be described in greater detail. In addition, the configuration and construction of the reinforcing element used for the present invention will be described.

A permanently helically formed resilient filament is formed of material whose tensile breaking strength is high as described above and has a relatively small diameter of 0.1 mm to 1.0 mm, preferably 0.13 mm to 0.5 mm. 2 to 50, preferably 3 to 30 of helically formed filaments are merely assembled together without twisting at random and without aligning the helically formed filaments and without twisting them together by means of exterior binding wires.

In FIGS. 2a and 2b is shown a configuration of a helically formed filament. The ideal shape of an outer contour projected on a plane perpendicular to the axial direction of one pitch of the helically formed filament should be a true circle for the purpose of equalizing the stress subjected to it. However, it is very difficult in technique to obtain such true circle and a number of steps are obliged to be taken in order to incorporate such filament into the tire, so that it is further difficult to maintain such true circle in tire products.

Experimental tests and considerations on practically allowable deviation from such true circle have yielded the result that if a ratio of a maximum diameter (Dmax) of the outer contour projected on a plane perpendicular to the axial direction of one pitch of the helically formed filament to a minimum diameter (Dmin) thereof at any position of the tire side portion lies within a range to be described later, the stress subjected to the filament becomes substantially uniformly distributed, and that hence the premature fatigue breakage is not induced. That is, in FIGS. 2a and 2b, $$\frac{Dmax}{Dmin}$$

is required to be 1 to 1.5.

In addition, an average diameter D, that is, $$\frac{Dmax + Dmin}{2},$$

of the outer contour projected on a plane perpendicular to the axial direction of one pitch of the filament is required to be 2 $\phi$ to 20 $\phi$, preferably 3 $\phi$ to 15 $\phi$, $\phi$ being the diameter of the helically formed filament.

As an alternative method of obtaining a desirous elongation of filaments, each formed of material having a high tensile breaking strength, for example, high carbon steel and assembled together without twisting, it might be conceived to arrange undulate filaments in parallel with each other in one same plane. In this case, however, stress becomes concentrated into bent portions of the undulate filament in response to extension and compression in the lengthwise direction thereof. In addition, this stress is a bending stress to be concentrated into a part of the cross section of the filament, so that there frequently occurs the premature fatigue breakage at the bent portions of the filament. As a result, it has been found out that the measures described could not be used in practice in place of the above described helically formed filament.

That is, in the present invention, the use of the helically formed filament ensures a necessary elongation. In this case, the stress produced in response to the extension or compression in the lengthwise direction of the helically formed filament is substantially uniformly distributed over any portion in the lengthwise direction thereof. In addition, the above mentioned stress is a torsional shearing stress which is liable to be easily distributed in a relatively uniform manner over the cross section of the filament, so that it is possible to completely prevent the fatigue breakage of the tire.

As to the filament diameter $\phi$, in order to prevent the tire from being broken due to cord fatigue, it is preferable to make the filament diameter $\phi$ small. In addition, in view of improving the cut resistant property of the tire, the strong force per unit area of the same filament can be increased by working it, so that it is preferable to use a filament which is possibly small in diameter. But, the use of a filament whose diameter $\phi$ is smaller than 0.1 mm results in occurrence of cuts of the filament in non-allowable frequency in the step of shaping the helically formed filament and is not economical.

On the contrary, if use is made of a filament whose diameter $\phi$ is larger than 1.0 mm, internal stress produced in the filament during the step of shaping the helically formed filament becomes excessively large. In addition, torsional shearing stress which occurs when extension or compression is subjected to the filament in its lengthwise direction is concentrated into the outer contour of the filament. As a result, the overall cross sectional area required for maintaining the strength which is sufficient to resist against the same exterior force becomes larger than that necessary for the thin filament, thereby requiring much amount of material. As a result the use of the filament having a diameter larger than 1.0 mm is not economical.

As seen from the above, the diameter $\phi$ of the filament is required to lie within a range from 0.1 mm to 1.0 mm.

The relation between the diameter $\phi$ of the filament and the average diameter D of the outer contour projected on a plane perpendicular to the axial direction of one pitch of the helically formed filament will now be described. If D is smaller than 2 $\phi$, the pitch of the helically formed filament is required to be excessively small for the purpose of obtaining the desired elongation. As a result, the cut of filament frequently occurs in non-allowable frequency, in the same manner as in the case of using the filament whose diameter is excessively small. At the same time, the internal stress produced when the filament is helically formed becomes excessively large.

Respective helically formed filaments are assembled together without twisting at random to form a cord-shaped reinforcing element which is then arranged in the tire. Each of respective helically formed filaments constituting each reinforcing element is arranged in the same element in zigzag. As a result, if D is larger than 20 $\phi$, the sectional area formed between the most protruded portions of two adjacent helically formed filaments becomes too small to maintain that distance therebetween which is required for maintaining the desired separation resistant property, and as a result, sufficiently large cut resistant property could not be obtained. On the contrary, if it is desired to obtain the sufficiently high cut resistant property, the above mentioned distance required between the two adjacent elements could not be obtained, so that a sufficiently high separation resistant property could not be obtained. In addition, in order to obtain the sufficiently high separation resistant property, not only the above mentioned distance required between the two adjacent helically formed filaments, but also the distance between the side rubber and the reinforcing element and the distance between the reinforcing element and the carcass in the case of one rubberized layer containing the reinforcing element are required to be kept within a certain range. In addition, in the case of at least two rubberized layers, the distance between the two adjacent reinforcing elements must also be kept within a certain range. Moreover, the last mentioned distance is required to be kept between the most protruded portions of the two adjacent reinforcing elements, so that it is necessary to use a thick rubberized layer containing the reinforcing elements embedded therein, thereby significantly impeding economy. As seen from the above, the average diameter D should be 2 $\phi$ to 20 $\phi$.

The pitch of the helically formed filament is suitably selected in association with modulus of elasticity of the filament, diameter $\phi$ of the filament and average diameter D of the outer contour of the helically formed filament for the purpose of obtaining an optimum elongation at tensile breaking strength and modulus of elasticity required for the use of the tire.

The number of helically formed filaments adapted to be assembled together without twisting at random so as to provide a reinforcing element will now be described. If use is made of one helically formed filament, the diameter $\phi$ thereof becomes excessively large for the purpose of obtaining the required cut resistant property of the tire. As a result, the above mentioned problem is involved and at the same time the effect of improving reinforcing element-to-rubber bonding force will be decreased. On the contrary, if use is made of more than 50 helically formed filaments, the diameter of the outer contour projected on a plane perpendicular to the axial direction of one pitch of the reinforcing element becomes excessively large even though care is taken to make the average diameter D of the one helically formed filament small. As a result, the same problem occurs as in the case of making the average diameter D excessively large. As seen from the above, the number of helically formed filaments adapted to be assembled together without twisting at random to provide the reinforcing element is suitably selected into a range of 2 to 50, preferably, 3 to 30, by taking balance between the cut resistant property and other characteristics required for the use of the tires on the one hand and economy on the other hand into consideration.

The relation between the force subjected to the reinforcing element constructed as above described according to the invention and to a conventional stranded steel cord on the one hand and elongations thereof on the other hand will now be described with reference to a practical example.

In FIG. 3 is shown tensile test results with the force in kg/cord or kg/bundle taken on ordinate and with the elongation in % on abscissa. In FIG. 3, a dotted lines curve $\alpha$ shows a tensile test result yielded from a conventional steel cord having a strand construction of 1×5, filament diameter $\phi$ of 0.25 mm and cord diameter of 0.68 mm and full line curves $\beta$ and $\gamma$ show tensile test results yielded from reinforcing elements formed of helically formed steel filaments according to the invention. The tensile test result shown by the full line curve $\beta$ was yielded from a reinforcing element composed of a bundle of 5 filaments according to the invention each having a filament diameter $\phi$ of 0.25 mm, average diameter D projected on a plane perpendicular to the axial direction of one pitch of the filament of 0.95 mm, $$\frac{Dmax}{Dmin} = 1.25, \frac{D}{\phi} = 3.8$$

and pitch of 10.5 mm. The tensile test result shown by the full line curve $\gamma$ was yielded from a reinforcing element composed of a bundle of 14 filaments according to the invention each having a filament diameter $\phi$ of 0.175 mm, average diameter D projected on a plane perpendicular to the axial direction of one pitch of the filament of 1.1 mm, $$\frac{Dmax}{Dmin} = 1.20, \frac{D}{\phi} = 6.3$$

and pitch of 11 mm. In FIG. 3, a dotted lines curve $\delta$ shows a tensile test result yielded from a conventional nylon cord.

As seen from FIG. 3, the reinforcing elements according to the invention provide an ideal relation between the force subjected to the reinforcing elements and the elongation thereof, which relation being usable for the side-cut protective layer for the pneumatic tire for off-road vehicles aimed at the present invention.

As described above, the reinforcing element composed of helically formed filaments according to the invention is extremely deformable so as to reduce the amount of relative displacement between the rubber and the reinforcing element. As a result, it is possible to reduce separation failure to be induced at the ends of the reinforcing element. In addition, in the case of forming the helically formed filaments into bundles 14 as shown in FIG. 13, the filaments are not twisted together as in the case of the steel cords, but are merely assembled together without twisting at random. Thus, it is possible to sufficiently penetrate the rubber into gap formed between the filaments and mechanical bonding force thus produced can compensate for insufficient reinforcing rubber-to-filament chemical bonding force.

The use of the reinforcing element composed of helically formed filaments according to the invention ensures a significant reduction of compression modulus of elasticity of the reinforcing element, so that the reinforcing element can absorb the compressive force instantaneously subjected thereto, thereby significantly decreasing occurrences of the cord breakage without breaking.

The difference between the compression modulus of elasticity and compressive fatigue property of the reinforcing element according to the invention and those of the conventional stranded steel cord for tires will now be described with reference to practical examples.

Figure 4:
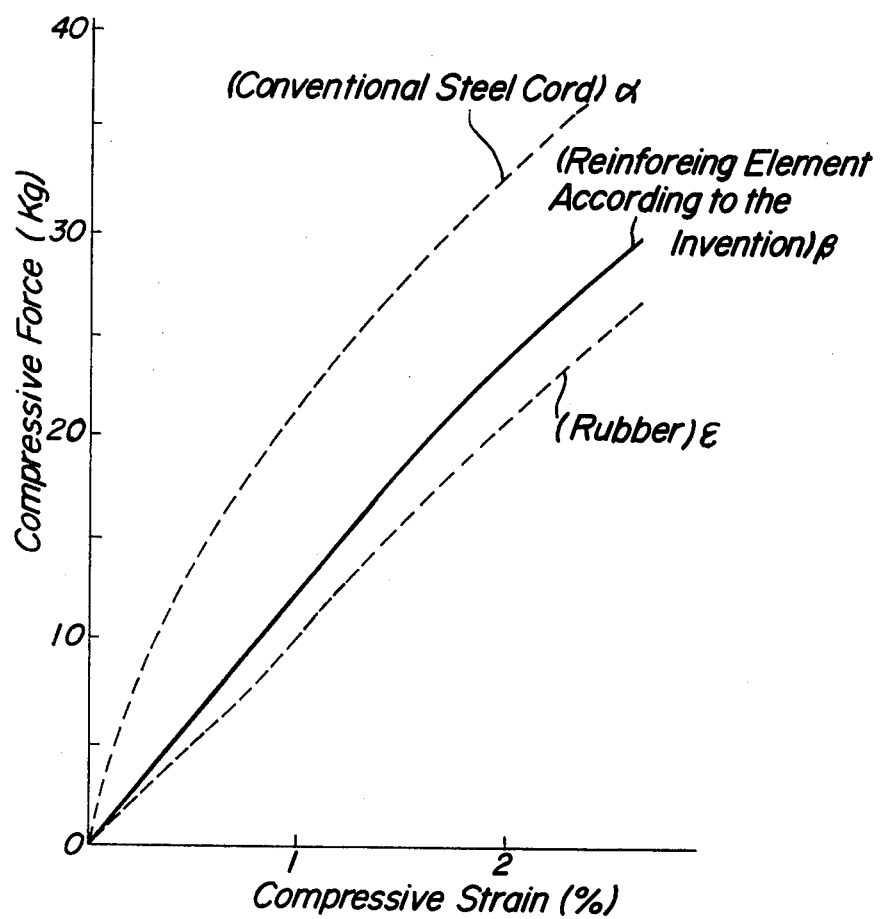
FIG. 4 is a graph illustrating compression test results yielded from a reinforcing element according to the invention as compared with those yielded from conventional steel cord and rubber cord.

In FIG. 4 are shown compression test results. In FIG. 4, the compressive force in kg is taken on ordinate and the compressive strain in % is taken on abscissa. In this test, use was made of two test pieces, one of which being composed of a cylindrical rubber containing one conventional stranded steel cord embedded therein and the other being composed of a cylindrical rubber containing one bundle according to the invention embedded therein.

In FIG. 4, a dotted lines curve $\alpha$ shows the relation between the compressive force in kg subjected to the conventional stranded steel cord having a strand construction of 1×5, filament diameter $\phi$ of 0.25 mm and cord diameter of 0.68 mm and the compressive strain in % produced therein. A full line curve $\beta$ shows the relation between the compressive force in kg subjected to the reinforcing element composed of 5 helically formed filaments according to the invention each having a diameter $\phi$ of 0.25 mm, average diameter D projected on a plane perpendicular to the axial direction of one pitch of the filament of 0.95 mm, $$\frac{Dmax}{Dmin} = 1.25, \frac{D}{\phi} = 3.8$$

and pitch of 10.5 mm and the compressive strain in % produced therein.

In FIG. 4, a dotted lines curve $\epsilon$ shows the same relation with respect to a test piece formed of rubber only. It is a matter of course that the rubber of all of these three test pieces is of the same rubber compound.

As seen from FIG. 4, the compression modulus of elasticity of the reinforcing element according to the invention is extremely small, whose value being near to a value of the rubber specimen.

Figure 5:
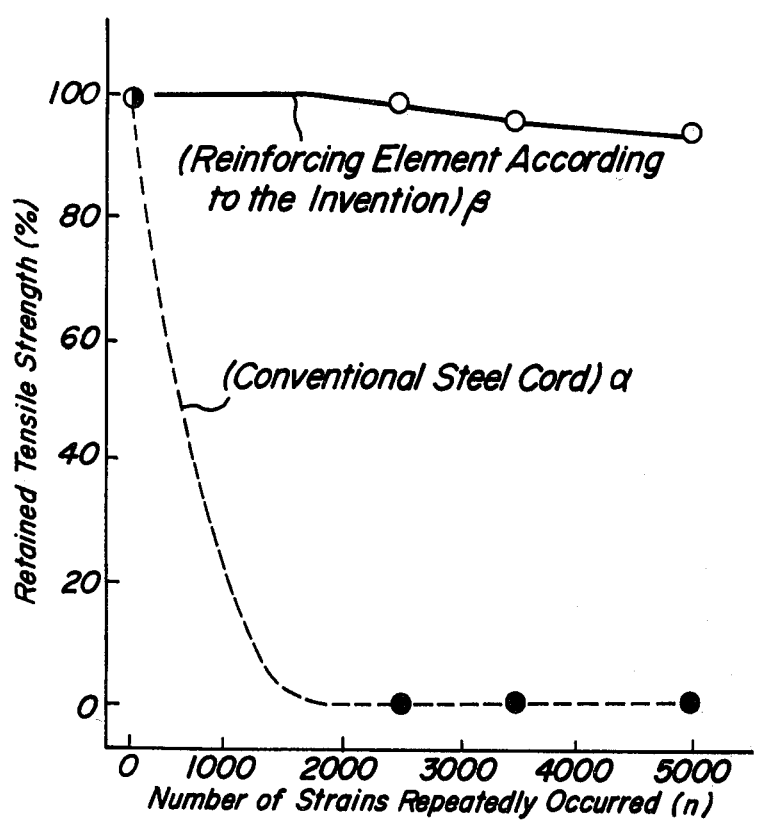
FIG. 5 is a graph illustrating compressive fatigue test results yielded from a reinforcing element according to the invention as compared with that yielded from a conventional steel cord.

In FIG. 5 is shown compressive fatigue test result. That is, retained tensile strength in % which is percentage of tensile strength after the fatigue test with that of a new tire is taken on ordinate and number of strains repeatedly occurred given in n is taken on abscissa. In the present test, use was made of two test pieces, one being composed of a rectangular rubber body containing a plurality of conventional stranded steel cords embedded therein and the other being composed of a rectangular rubber body containing a plurality of bundles according to the invention embedded therein, and these two test pieces were subjected to 5% repeating compressive strain.

In FIG. 5, a dotted lines curve α shows retained tensile strength as a function of the number of strains repeatedly occurred for the conventional stranded steel cord having a strand construction of 1×5, filament diameter φ of 0.25 mm and cord diameter of 0.68 mm and a full line curve β shows a relation similar to the dotted lines curve α for the reinforcing element according to the invention composed of 5 helically formed steel filaments each having a filament diameter φ of 0.25 mm, average diameter D projected on a plane perpendicular to the axial direction of one pitch of the filament of 0.95 mm, $$\frac{D\max}{D\min} = 1.25, \frac{D}{\phi} = 3.8$$

and pitch of 10.5 mm. As seen from FIG. 5, the retained tensile strength of the reinforcing force according to the invention is far superior to that of the conventional steel cord.

The configuration, construction and effect of the side portion reinforcing layer containing the reinforcing element formed and constructed as above described will now be described. As coating rubber which constitutes the side portion reinforcing layer together with the reinforcing element according to the invention use may be made of a rubber compound having a Shore A hardness at room temperature of 45° to 85°, 300% modulus of elasticity of 150 to 250 kg/cm², and tensile breaking strength of 150 to 250 kg/cm². It is preferable to change the physical property of the rubber in dependence with the position of the side portion reinforcing layer. Particularly, it is preferable to use a hard rubber as that rubber which is located near the carcass ply and a soft rubber as the rubber which is distant apart from the carcass ply for the purpose of obtaining a better effect of reinforcing the side portion of the tire against damage.

Direction of arranging the reinforcing element in the side portion reinforcing layer may be selected in dependence with the physical property and location of the reinforcing element. The reinforcing element located at the maximum width position of the carcass in section is inclined at 0° to 70° with respect to that radial plane of the tire which is projected on a vertical center section through the rotational axis of the tire.

The use of an excessively large inclined angle has a great influence upon the tire displacement at the sacrifice of the elongation in the circumferential direction of the tire. Use may be made of one or at least two side portion reinforcing layers. In the latter case, it is preferable to extend the reinforcing elements associated with one of these layers in an opposite direction to the reinforcing elements associated with the other layer.

The arrangement of the side portion reinforcing layer containing the reinforcing elements will now be described. The side portion reinforcing layer should be arranged so as to protect the maximum width position of the section of the carcass ply which tends to significantly project in the direction of the rotational axis of the tire when the tire is subjected to the load. The side portion reinforcing layer is normally extended from near the shoulder through the above described maximum width position to near the bead and to the near the tread. But, the side portion reinforcing layer may also be extended from near one of the beads through the crown portion to near the other bead, that is, may be made integral with the left and right side portion reinforcing layers. The side portion reinforcing layers may be disposed in the side wall such that these layers are made in contact with the carcass ply, that a thin rubber sheet is interposed between these layers and that these layers are separated from the carcass ply. Such arrangement of the side portion reinforcing layer is suitably adopted in dependence with the reinforcing element whose configuration and property and selected such that any desired effect can be attained.

The rubber constituting the side portion reinforcing layer may change its rigidity in a stepwise manner. It is advisalbe to use a relatively hard rubber as rubber located near the reinforcing element and about this rubber is superimposed a soft rubber for the purpose of alleviating the stress and strain subjected to the side portion reinforcing layer. Alternatively, it is advisable to use a hard elastic rubber for the purpose of restraining the movement of the ends of the reinforcing element and preventing the separation thereof from the rubber.

In addition, a rubberized layer containing cords composed of organic fiber such as nylon may preferably be superimposed about the side portion reinforcing layer.

The use of the reinforcing element composed of the helically formed filaments or at least two bundles thereof ensures the following additional effect. The helically formed filaments consituting the reinforcing element are not twisted contrary to the steel cords and assembled together without twisting at random. As a result, a sufficient amount of rubber can be penetrated into gaps formed between the filaments of the bundles, so that insufficient chemical rubber-to-filament bonding force can sufficiently be compensated by the mechanical bodning force.

As seen from the above, in the present invention, the rubber-to-filament bonding force is the sum of the chemical rubber-to-filament bonding force and the mechanical rubber-to-filament bonding force. The separation resistant property of the reinforcing element according to the invention, therefore, is far superior to that of the conventional steel cord.

The maximum rubber-to-filament bonding force, however, is limited in the case of manufacturing the tire in an industrial mass production scale. In addition, the above mentioned kind of tire for off-road vehicles is subjected to excessively heavy load when the tire is used under severe conditions, and as a result, even though the reinforcing element composed of the helically formed filaments is used, there is a risk of the upper limit of the rubber-to-filament bonding force or the breaking strength of the rubber located between the two adjacent reinforcing elements being exceeded. Particularly, when the tire is used for a relatively long time and subjected to a number of strains repeatedly occurred, the rubber near the reinforcing elements or the rubber-to-filament bonding becomes minutely broken. Such minute breakage of the rubber is grown and developed to induce the separation failure of the tire.

The inventors have foreseen that the tire for off-road vehicles subjected to heavy load when it is used under severe conditions is destined to often exceed an upper limit of the breaking strength of the tire even when the tire is designed to significantly increase its breaking strength. The inventors, therefore, have recognized that, even if the higher the rubber-to-reinforcing element bonding force and breaking strength of rubber near the reinforcing element, the better, it is more advantageous in commercial production that such breakage of rubber and bonding force is of ordinary value but also such breakage is prevented from being grown and developed than that both the bonding force and breaking strength is as high as possible.

When the pneumatic tire for off-road vehicles is used for a relatively long time and hence the durability jthereof is quite important, a ratio δ of a pitch between the two adjacent reinforcing elements each composed of the helically formed filaments to a pitch S in mm between the midlines of the reinforcing elements is given by $$\delta = \frac{S - (D + d - \phi)}{S}$$

where D is an average diameter projected on a plane perpendicular to the axial direction of one pitch of a helically formed filament in mm and d is an effective diameter of the reinforcing element in mm which is given by $1.25 \times \sqrt{N} \times$ filament diameter $\phi$, where N is the number of filaments for constituting the reinforcing element.

It is preferable to arrange the reinforcing elements such that the number thereof per unit length of the reinforcing layer is relatively small, that is, δ is 0.11 to 0.78.

Experimental tests have yielded the result that as the pitch S between the midline of the two adjacent reinforcing elements becomes smaller, the shearing force produced in the rubber surounding the reinforcing elements is increased, that if δ is smaller than the lower limit 0.11 thereof, the shearing force is rapidly increased, that very small pitch S between the midlines of the two adjacent reinforcing elements causes the space formed therebetween to make extremely narrow thus rapidly growing the above mentioned initial breakage and hence inducing the separation failure of the tire, and that if δ exceeds its upper limit 0.78, the effect of improving the side-cut resistant property aimed at the present invention could not be attained.

The pitch S between the midlines of the two adjacent elements is drived on the basis of the average number of reinforcing elements embedded in a length 100 mm of the reinforcing layer in a direction perpendicular to the axial direction of the reinforcing elements arranged in the maximum width position of the tire in the vertical center section through the rotational axis of the tire.

The helically formed filament constituting the reinforcing element of the side portion reinforcing layer may be formed of wire materials having an excellent rubber-to-filament bonding property, for example, brass plated steel filament, glass fiber, aromatic polyamide having a high modulus of elasticity and the like.

The invention will now be described in greater detail with reference to practical examples.

EXAMPLE 1

In FIG. 6 is shown a cross section of one-half of a pneumatic radial tire for off-road vehicles according to the invention, parts being shown in vertical center section through the rotational axis of the tire. The tire shown in FIG. 6 has a size of 18.00 R25 32 PR.

A carcass ply 1 is composed of one rubberized carcass ply formed of a steel cord arranged along the above described section through the rotational axis of the tire and having a construction of $(1\times3)\times0.18$ mm $+9\times0.18$ mm $+(9\times4)\times0.18$ mm $+0.1$ mm. This steel cord has a tensile breaking strength of 310 kg/cord, elongation at breaking strength of 3% and the number of the steel cords at the crown center is 4.5 cords/25 mm.

The carcass ply is of a toroidal shape and wound about a pair of bead wires 2 to form a turn-up portion 3 which is extended from a base line A toward the crown for 100 mm. In order to reinforce the bead portion, about the bead portion is superimposed a chipper 4 composed of a rubberized steel cord which is the same as that used for the carcass ply 1 and inclined at an angle of about 60° with respect to the tire radial direction.

In a triangular portion surrounded by the carcass ply 1 and the turn-up portion 4 wound around the bead wire 2 is arranged a bead filler 5 formed of a hard rubber. In a crown portion 6, between the carcass 1 and a tread 7 are interposed 4 belts 8 each composed of a reinforcing ply.

In a side portion 11, about the carcass ply 1 is superimposed a side portion reinforcing layer 12. Between the carcass ply 1 and the side portion reinforcing layer 12 is interposed a shock absorbing sheet 9 which is extended from a position distant apart from the base line A by 135 mm to a shoulder portion 10 and has a width of 275 mm and thickness of 1.0 mm. The shock absorbing sheet 9 is formed of rubber having a Shore A hardness of 76°, breaking strength of 220 kg/cm² and 300% modulus of elasticity of 200 kg/cm².

The side portion reinforcing layer 12 is superimposed about the shock absorbing sheet 9 and extended from a position distant apart from the base line A to the shoulder portion 10. The side portion reinforcing layer 12 has a width of 245 mm. The side portion reinforcing layer 12 is composed of a rubberized layer containing a reinforcing element formed of a bundle of 9 helically formed steel filaments.

Each filament has a diameter $\phi$ of 0.25 mm, average diameter D projected on a plane perpendicular to the axial direction of one pitch of the filament of 2.07 mm, $$\frac{D_{max}}{D_{min}} = 1.5, \frac{D}{\phi} = 8.3$$

and pitch of 12 mm.

The number of the reinforcing elements per 25 mm of the rubberized layer is 6.5 elements/25 mm. The reinforcing elements are inclined at an angle of 0° with respect to the vertical center section through the rotational axis of the tire, that is, arranged along the radial plane. The reinforcing element has a tensile breaking strength of 117 kg/element and an elongation at breaking strength of 5.5%.

The coating rubber containing the reinforcing elements embedded therein has a Shore A hardness of 76°, 300% modulus of elasticity of 200 kg/cm², and tensile breaking strength of 220 kg/cm². The side portion reinforcing layer 12 is covered with a side wall rubber 13 having a shore A hardness of 54°, tensile breaking strength of 190 kg/cm² and 300% modulus of elasticity of 85 kg/cm². That portion of the side wall rubber 13 which is located at the maximum width position B of the carcass ply of the tire has a thickness of 15 mm.

The tire constructed as described in the present example 1 was used in mine site and compared with a pneumatic radial tire for off-road vehicles which is not provided with the side portion reinforcing layer 12 under the same service condition. Both the tire according to the present example 1 and the tire to be compared were used for a vehicle of Cat. 769B. The number of each of the respective tires tested was 50.

Experimental tests have yielded the result that percentage of producing useless waste tires from the tire to be compared due to the side-cut penetration was 14% and the number of the useless waste tires was 7, while the similar percentage of the tire according to the invention was 4% and the similar number was 2. As seen from the above, the side-cut resistant property of the tire according to the invention is far superior to that of the tire to be compared.

In addition, experimental tests have demonstrated that a ratio of the number of completely worn tires to be compared to the tested number 24 thereof was 48%, that the similar ratio of the tire according to the invention was 56% and that the tire according to the invention had no bad influence upon the other properties of the tire. In addition, analytical tests have shown the result that, in the side portion reinforcing layer of the completely worn tire according to the invention, any separation could not be found out therein.

Static load tests on longitudinal deflection and widthwise deflection of the tire according to the invention and the tire to be compared have yielded the result that, let both the longitudinal and widthwise deflection of the tire to be tested be 100, the longitudinal deflection of the tire according to the present example was 99 and the widthwise flexure was 95, these flexures being slightly smaller than those of the tire to be compared, and that these flexures had no influence upon the spring property of the tire as a whole.

In FIG. 7 is shown test results of the side-cut resistant property of the tire shown in FIG. 6 as compared with those of two tires to be compared one of which is similar in construction to the tire shown in FIG. 6, but which is not provided with the side portion reinforcing layer and the other tire to be compared is similar in construction to the tire shown in FIG. 6, but the side portion reinforcing layer thereof is composed of a rubberized fabric containing steel cords embedded therein and having a strand construction of $(7\times 3)\times 0.175$ mm$+1\times 0.15$ mm, elongation of 2.8% and tensile breaking strength of 116 kg/cord, number of cords of 6.5 cords/25 mm and cord angle of 90° with respect to the tire circumferential direction.

All of these tires were united with a standard rim of 13.00×25 and inflated by applying a standard internal pressure of 6.3 kg/cm³. The tires were remained as they were for about 24 hours. A tapered sharp cutter whose taper angle is approximately 15° and blade width is 60 mm was urged against the tires to be tested at room temperature with a speed of 50 mm/min. The side-cut resistant property of the tires to be tested was observed with respect to the breaking load as a function of the amount of axial displacement of the cutter into the tires. The cutter blade is inclined at an angle of 45° with respect to the vertical center section through the rotational axis of the tire and urged against the maximum width position of the carcass line of the tire. The cutter blade is inclined because the tire is subjected to cut during rotation to produce a plenty of inclined cut defects.

In FIG. 7, a full line curve A shows the test result of the tire according to the invention shown in FIG. 6. A dot-dash lines curve B shows the test result of one of the tires to be compared which is not provided with the side portion reinforcing layer. A dotted lines curve C shows the test result of the other tire to be tested which is provided with the rubberized fabric containing the conventional steel cords embedded therein. The cut resistant energy in kg.mm is represented by the area resulted from the multiplication together of the breaking load in kg and the displacement in mm. In FIG. 7, the breaking load in kg is taken on ordinate and the amount of displacement of the cutter in mm is taken on abscissa, so that the cut resistant energy is represented by the area of triangle formed between each of these curves A, B, C and the abscissa.

As seen from FIG. 7, the cut resistant energy in kg.mm of the tire of the example 1 according to the invention shown by the full line curve A is 184 kg.mm which is superior to 100 kg.mm and 147 kg.mm of the conventional tires to be compared shown by the dot-dash lines and dotted lines curves B and C, respectively.

Figure 8:
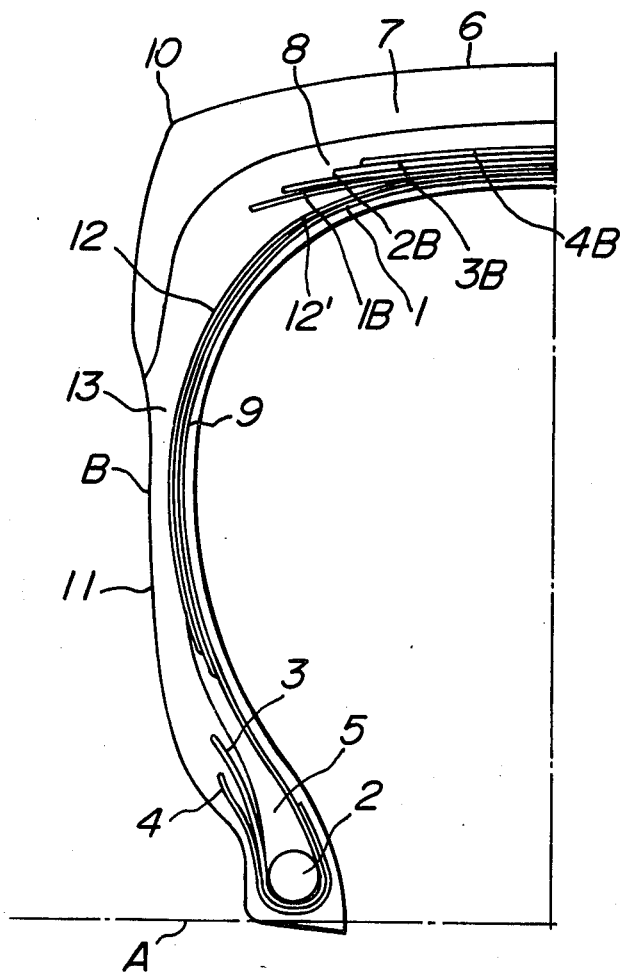

In FIG. 8 is shown a modified embodiment of the tire according to the invention. In the present embodiment, the side portion reinforcing layer 12 shown in FIG. 6 is passed over the crown portion 6 toward another side portion (not shown). The present embodiment makes it possible to not only protect a shoulder portion against cuts, but also reinforce the belt 8. In addition, use may be made of only one side portion reinforcing layer instead of two side portion reinforcing layers shown in FIG. 6, thereby improving the manufacturing efficiency of the tire.

Figure 9:
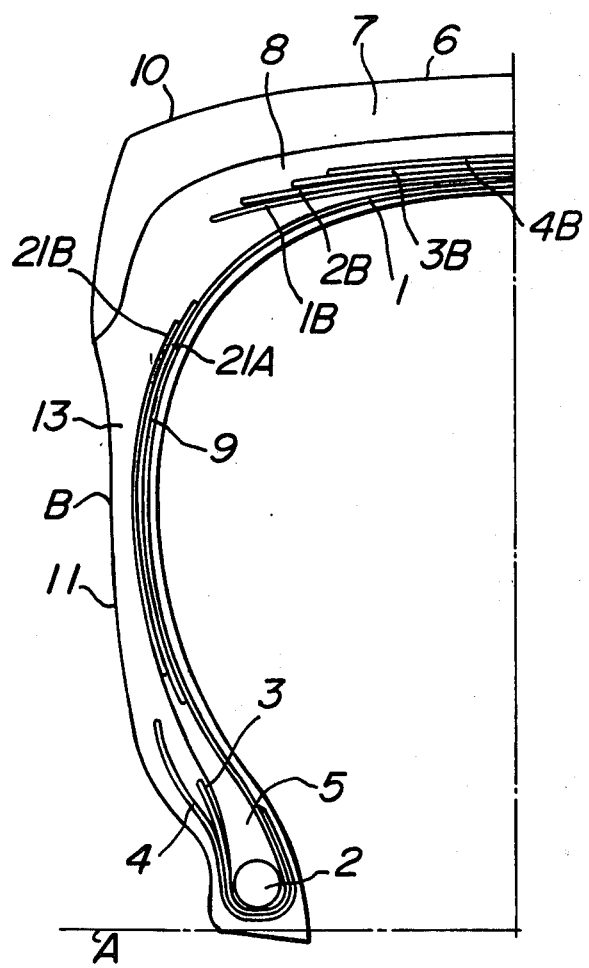

In FIG. 9 is shown another modified embodiment of the tire according to the invention. In the present embodiment, the side portion reinforcing layer 12 shown in FIG. 6 is composed of 2 rubberized layers 21A, 21B each containing a reinforcing element formed of a bundle of helically formed filaments embedded therein. The side portion reinforcing layer 21A is located near the carcass ply 1 and has a width of 245 mm which is made wider than a width of 215 mm of the side portion reinforcing layer 21B superimposed about the side portion reinforcing layer 21A. These 2 rubberized layers 21A, 21B are symmetrically extended from a point of symmetry located at the maximum width position B of the tire.

Each helically formed steel filament has a diameter $\phi$ of 0.175 mm, average diameter D projected on a plane perpendicular to the axial direction of one pitch of the filament of 0.95 mm, $$\frac{D_{max}}{D_{min}} = 1.25, \frac{D}{\phi} = 4.5$$

and pitch of 11 mm. 5 of these helically formed steel filaments are assembled together without twisting at random to form a bundle which is used as the reinforcing element. The number of the reinforcing elements per 25 mm of the rubberized layer is 5. The reinforcing element is inclined at 30° with respect to the tire radial direction. The reinforcing element has a tensile breaking strength of 63 kg/element and an elongation at tensile breaking streangth is 7.2%. The reinforcing elements in the first side portion reinforcing layer 21A are oppositely inclined to the reinforcing elements in the second side portion reinforcing layer 21B.

The coating rubber containing the reinforcing element embedded therein has a Shore A hardness of 67°, 300% modulus of elasticity of 134 kg/cm$^2$, elongation at tensile breaking strength of 430% and tensile breaking strength of 250 kg/cm$^2$. The use of the 2 side portion reinforcing layers 21A, 21B whose reinforcing elements are oppositely inclined with each other ensures a further improvement in the side-cut preventive effect. As a result, the rigidity of the side portion of the tire becomes increased. In addition, in order to prevent the stress from concentrating into the end of the reinforcing element, the reinforcing element whose elongation is large is surrounded by the soft coating rubber.

Figure 10:
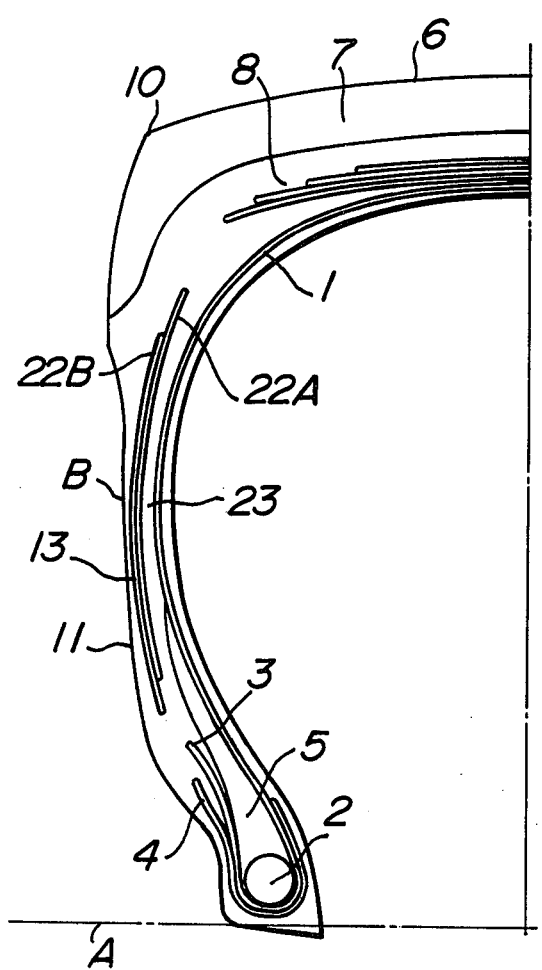

In FIG. 10 is shown a further modified embodiment of the tire according to the invention which can further improve the side-cut preventive effect. In the present embodiment, the side portion reinforcing layer 12 shown in FIG. 6 is altered such that a side portion reinforcing layer 22 is distant apart from the carcass ply 1 and composed of 2 rubberized layers 22A, 22B each containing a bundle of helically formed filaments embedded therein. The side portion reinforcing layer 22A near the carcass ply 1 is extended upwardly from a point kept away 145 mm from the base line A and having a width of 230 mm. The side portion reinforcing layer 22B superimposed about the side portion reinforcing layer 22A is extended upwardly from a point kept away 130 mm from the base line A and having a width of 230 mm.

Each helically formed steel filament has a diameter $\phi$ of 0.21 mm, average diameter D projected on a plane perpendicular to the axial direction of one pitch of the filament of 1.2 mm, $$\frac{Dmax}{Dmin} = 1.25, \frac{D}{\phi} = 5.7$$

and pitch of 8.8 mm. 5 of these helically formed steel filaments are assembled together without twisting at random to form a bundle which is used as the reinforcing element. The number of the reinforcing elements per 25 mm of the side portion reinforcing layer is 4.5. The reinforcing element is inclined at 45° with respect to the tire radial direction. The reinforcing element has a tensile breaking strength of 63 kg/bundle and an elongation at tensile breaking strength is 8.3%. The reinforcing elements in the first side portion reinforcing layer 22A are oppositely inclined to the reinforcing elements in the second side portion reinforcing element 22B.

The coating rubber containing the reinforcing element embedded therein has a Shore A hardness of 67°, 300% modulus of elasticity of 134 kg/cm$^2$, elongation at tensile breaking strength of 430% and tensile breaking strength of 250 kg/cm$^2$.

Between the carcass ply 1 and the side portion reinforcing layers 22A, 22B is interposed a soft shock absorbing rubber pad 23. The pad 23 has a thickness of 11 mm at the maximum width point B of the carcass line. The pad 23 has a Shore A hardness of 58°, 300% modulus of elasticity of 124 kg/cm$^2$, tensile breaking strength of 274 kg/cm$^2$ and elongation at tensile breaking strength of 484%.

In the present embodiment, between the carcass line 1 and the side portion reinforcing layers 22A, 22B is interposed the soft rubber pad 23, so that the absorption of energy produced when the tire is deformed due to the penetration of rocks, etc. into the tire is improved, thereby further improving the side-cut protective effect of the tire.

Figure 11:
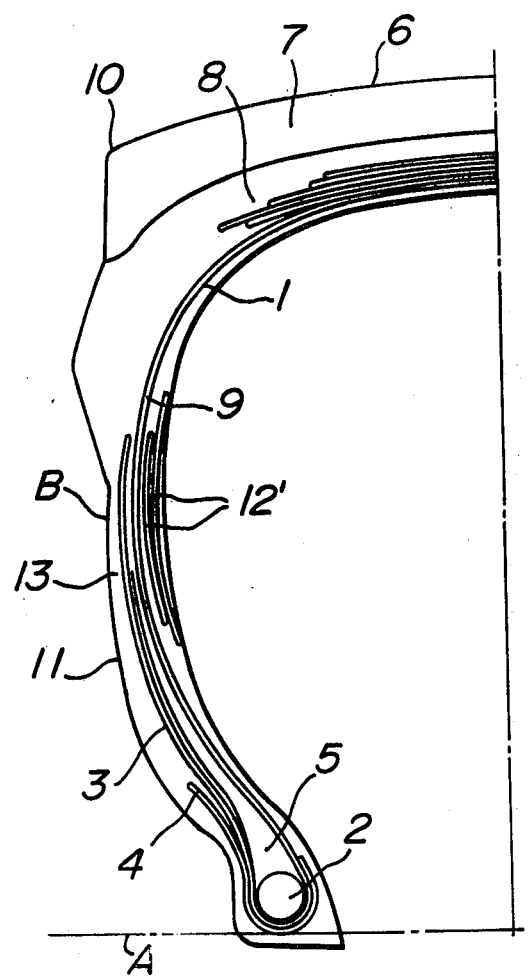

In FIG. 11 is shown a still further modified embodiment of the tire according to the invention. In the present embodiment, the turn-up portion 3 of the carcass ply 1 formed of steel cords is extended upwardly beyond the maximum width position B' of the carcass line and inside thereof is disposed a side portion reinforcing layer 12' composed of the reinforcing elements each formed of the bundle of helically formed steel filaments.

Figure 12:
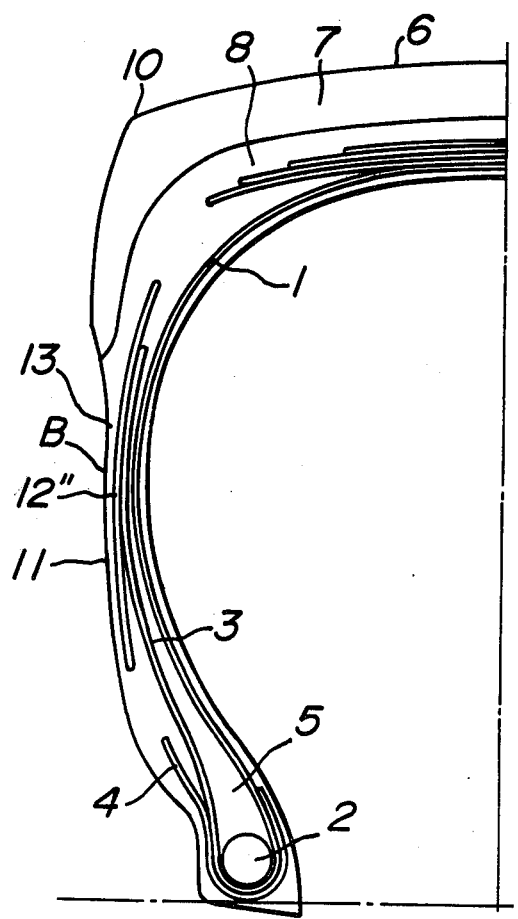

In FIG. 12 is shown another modified embodiment of the tire according to the invention. In the present embodiment, the turn-up portion 3 of the carcass ply 1 formed of steel cords is extended upwardly beyond the maximum width position B of the carcass line and outside thereof is disposed a side portion reinforcing layer 12" composed of the reinforcing elements each formed of the bundle of helically formed steel filaments. The side portion reinforcing layer 12" functions to protect the turn-up portion 3 of the carcass ply 1.

The above embodiments have been described with reference to the pneumatic tire for off-road vehicles, but the invention may also be applied to a tire for trucks, rally racing vehicles, etc. which are liable to be subjected to side-cuts.

What is claimed is:

1. An off-road pneumatic radial tire having an excellent sidecut resistant property, comprising; a radial carcass body composed of at least one rubberized ply layer each containing metal cords embedded therein and a belt superimposed about said radial carcass body and having a high rigidity, said tire comprising 1 or 2 extensible and compressible rubberized side portion reinforcing layers independently arranged at each side portion of the tire and on one side of said carcass at that area of each side portion of the tire which is inclusive of at least the maximum cross section position of the carcass and each containing a reinforcing element embedded therein and composed of a bundle of helically formed filaments, each bundle having 3 to 30 filaments and each bundle formed by merely assembling together said helically formed filaments without twisting at random wherein each filament is formed of a steel wire material, said reinforcing elements each having the helically formed filament having a diameter $\phi$ in the range of 0.1 mm to 1.0 mm, and an average diameter D of an outer contour projected on a plane perpendicular to the axial direction of one pitch of the filament defined by Dmax+Dmin/2 in the range of 2$\phi$ to 20$\phi$, an elongation at tensile breaking strength which is at least 1.5 times larger than that of said metal cord of the radial carcass body, wherein said reinforcing element of each side portion reinforcing layer located at the maximum width position of the carcass in a vertical center section through the rotational axis of the tire is inclined at 0° to 70° with respect to a radial plane which is projected on and in parallel with said vertical center section, wherein a ratio $\delta$ of a space formed between the two adjacent reinforcing elements to a pitch S in mm between the midlines of said reinforcing elements is given by:

$$\delta = \frac{S - (D + d - \phi)}{S} = 0.11 \text{ to } 0.78$$

where, d is an effective diameter in mm of said reinforcing element which is given by:
$1.25 \times \sqrt{N} \times \phi$ where, N is the number of filaments constituting said reinforcing element, a shock absorbing sheet interposed between said carcass ply and each of said side portion reinforcing layers and said off-road tire configured for mounting on a rim of at least 13.00×25.

2. A pneumatic radial tire according to claim 1, wherein the rubber containing said reinforcing element has a Shore A hardness of 50° to 85°, 300% modulus of elasticity of 80 to 230 kg/cm$^2$ and tensile breaking strength of 150 to 250 kg/cm$^2$.

3. A pneumatic radial tire according to claim 1, wherein said side portion reinforcing layer is arranged on the outside of said radial carcass.

4. A pneumatic radial tire according to claim 1, wherein said side portion reinforcing layer is independently arranged on each of two side portions of the tire.

5. A pneumatic radial tire according to claim 1, wherein said side portion reinforcing layer is continuously extended from one of the two side portions of the tire through the crown portion to the other side portion.

6. A pneumatic radial tire according to claim 1, wherein said side portion reinforcing layer is composed of at least two layers whose reinforcing elements are crossed with each other.

7. A pneumatic radial tire according to claim 1, wherein said rubberized side portion reinforcing layer is disposed on the inside of said carcass.

8. A pneumatic radial tire according to claim 1, wherein said side portion reinforcing layer is positioned entirely on the outside of said radial carcass body.

9. The pneumatic radial tire of claim 1 wherein said metal cords of said carcass body comprise a (1×3)×0.18 mm+9×0.18 mm+(9+4)×0.18 mm+0.1 mm steel cord having a tensile breaking strength of 310 kg/cord and an elongation of breaking strength of 3%.

10. The pneumatic radial tire of claim 1 wherein the number of metal cords of said carcass body at the crown center of the tire is 4.5 cords/25 mm.

11. The pneumatic radial tire of claim 1 wherein said shock absorbing sheet is formed of a rubber having a Shore A hardness of approximately 76°, a tensile breaking strength of approximately 220 kg/cm$^2$ and a 300% modulus of elasticity of 200 kg/cm$^2$.

12. The pneumatic radial tire of claim 1 wherein said shock absorbing sheet has a width of about 275 mm and a thickness of about 1.0 mm.

13. The pneumatic radial tire of claim 1 wherein the number of reinforcing elements is approximately 6.5 elements/25 mm.

14. The pneumatic radial tire of claim 1 wherein said rubberized side portion reinforcing layers comprise a coating rubber embedding said reinforcing elements, said coating rubber having a Shore A hardness, tensile breaking strength and modulus of elasticity matching those parameters of said shock absorbing sheet.

15. The pneumatic radial tire of claim 14 further comprising a sidewall rubber covering said side portion reinforcing layers, said sidewall rubber having a Shore A hardness, modulus of elasticity and a tensile breaking strength less than those of said coating rubber.

* * * * *